United States Patent
Nayak et al.

(10) Patent No.: US 11,909,717 B1
(45) Date of Patent: *Feb. 20, 2024

(54) DUPLICATE ADDRESS DETECTION FOR RANGES OF GLOBAL IP ADDRESSES

(71) Applicant: Juniper Networks, Inc., Sunnyvale, CA (US)

(72) Inventors: Manoj Nayak, Bangalore (IN); Rafik Puttur, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,954

(22) Filed: Feb. 9, 2023

Related U.S. Application Data (63) Continuation of application No. 17/216,085, filed on Mar. 29, 2021, now Pat. No. 11,606,332, which is a continuation of application No. 16/374,543, filed on Apr. 3, 2019, now Pat. No. 10,965,637.

(51) Int. Cl.
*H04L 29/12* (2006.01)
*H04L 61/5007* (2022.01)
*H04L 45/74* (2022.01)

(52) U.S. Cl.
CPC .......... *H04L 61/5007* (2022.05); *H04L 45/74* (2013.01)

(58) Field of Classification Search
CPC ................. H04L 61/5007; H04L 45/74; H04L 2101/659; H04L 2101/668; H04L 61/5092
See application file for complete search history.

(56) References Cited

U.S. PATENT DOCUMENTS

| | | |
|---|---|---|
| 6,243,749 B1 | 6/2001 | Sitaraman et al. |
| 6,247,060 B1 | 6/2001 | Boucher et al. |
| 6,578,074 B1 | 6/2003 | Bahlmann |

(Continued)

FOREIGN PATENT DOCUMENTS

| | | |
|---|---|---|
| CN | 102333013 A | 1/2012 |
| CN | 102333134 A | 1/2012 |

(Continued)

OTHER PUBLICATIONS

"Address Resolution Protocol," Wikipedia, retrieved Mar. 25, 2017, 7 pp.

(Continued)

*Primary Examiner* — Wutchung Chu
(74) *Attorney, Agent, or Firm* — Shumaker & Sieffert, P.A.

(57) ABSTRACT

An example network device determines to assign a number of global Internet protocol (IP) addresses to respective network interfaces, determines a subnetwork for the network interfaces, determines a prefix corresponding to the subnetwork, determines a first global IP address having the prefix, determines a range value that is equal to or greater than the number of global IP addresses, generates a message according to Duplicate Address Detection Protocol (DAD) including data indicating that the message includes a range of addresses, the data further indicating the first global IP address and the range value, and sends the message according to DAD to one or more host network devices to determine whether any global IP address in a range starting with the first global IP address and through the range value is in use by the one or more host network devices.

5 Claims, 4 Drawing Sheets

(56) References Cited

U.S. PATENT DOCUMENTS

| | | |
|---|---|---|
| 6,957,276 B1 | 10/2005 | Bahl |
| 6,982,953 B1 | 1/2006 | Swales |
| 7,178,059 B2 | 2/2007 | Greenspan et al. |
| 7,197,549 B1 | 3/2007 | Salama et al. |
| 7,292,538 B1 | 11/2007 | O'Rourke et al. |
| 7,321,893 B1 | 1/2008 | Rambacher et al. |
| 7,386,629 B2 | 6/2008 | Rover et al. |
| 7,533,165 B2 | 5/2009 | Makino |
| 7,624,181 B2 | 11/2009 | Townsley et al. |
| 7,648,070 B2 | 1/2010 | Droms et al. |
| 7,792,942 B1 | 9/2010 | Regan et al. |
| 7,991,863 B2 | 8/2011 | Zhao |
| 8,036,237 B2 | 10/2011 | Kolli et al. |
| 8,631,100 B2 | 1/2014 | Gandhewar et al. |
| 8,792,502 B2 | 7/2014 | Rajamanickam et al. |
| 9,166,872 B2 | 10/2015 | Cao et al. |
| 9,184,930 B2* | 11/2015 | Singh ............... H04L 12/2801 |
| 10,601,766 B2* | 3/2020 | Wackerly ............ H04L 63/126 |
| 10,924,452 B1* | 2/2021 | Nikolayev .......... H04L 61/5046 |
| 10,931,628 B2 | 2/2021 | Nayak et al. |
| 10,965,637 B1 | 3/2021 | Nayak et al. |
| 10,992,637 B2 | 4/2021 | Nayak et al. |
| 11,165,744 B2* | 11/2021 | Nayak ................ G06F 9/45533 |
| 2001/0017857 A1 | 8/2001 | Matsukawa |
| 2003/0076805 A1 | 4/2003 | Agrawal et al. |
| 2004/0030769 A1* | 2/2004 | Lim ......................... H04L 9/40 709/223 |
| 2004/0081122 A1 | 4/2004 | Koodli et al. |
| 2004/0083306 A1 | 4/2004 | Gloe |
| 2004/0117657 A1* | 6/2004 | Gabor ................. H04L 63/061 726/4 |
| 2004/0148398 A1* | 7/2004 | Park .................... H04L 61/5046 709/227 |
| 2004/0258007 A1* | 12/2004 | Nam ................... H04L 61/5046 370/310 |
| 2005/0044273 A1 | 2/2005 | Bouchat et al. |
| 2005/0066035 A1* | 3/2005 | Williams ............ H04L 12/4641 709/245 |
| 2005/0097223 A1 | 5/2005 | Shen et al. |
| 2005/0122946 A1 | 6/2005 | Won |
| 2005/0132209 A1 | 6/2005 | Hug et al. |
| 2005/0235000 A1 | 10/2005 | Keil |
| 2005/0253718 A1 | 11/2005 | Droms et al. |
| 2005/0253722 A1 | 11/2005 | Droms et al. |
| 2006/0020796 A1* | 1/2006 | Aura ..................... H04L 9/3236 713/168 |
| 2006/0020807 A1* | 1/2006 | Aura ..................... H04L 63/123 713/176 |
| 2006/0031488 A1 | 2/2006 | Swales |
| 2006/0047791 A1 | 3/2006 | Bahl |
| 2006/0155563 A1 | 7/2006 | Banerjee et al. |
| 2006/0221846 A1 | 10/2006 | Dyck et al. |
| 2006/0239266 A1* | 10/2006 | Babbar ............... H04L 61/5084 370/392 |
| 2007/0002833 A1 | 1/2007 | Bajic |
| 2007/0073882 A1 | 3/2007 | Brown et al. |
| 2007/0180499 A1 | 8/2007 | Van Bemmel |
| 2007/0203999 A1 | 8/2007 | Townsley et al. |
| 2007/0214352 A1 | 9/2007 | Convery et al. |
| 2007/0275726 A1* | 11/2007 | Lee .................... H04W 36/0016 455/436 |
| 2008/0046597 A1 | 2/2008 | Stademann et al. |
| 2008/0065747 A1 | 3/2008 | Kubota |
| 2008/0159222 A1* | 7/2008 | Akram ................... H04W 8/26 370/331 |
| 2009/0154406 A1 | 6/2009 | Kim et al. |
| 2009/0257425 A1 | 10/2009 | Sastry et al. |
| 2010/0042707 A1 | 2/2010 | Zhao |
| 2010/0042714 A1 | 2/2010 | Choi et al. |
| 2010/0191813 A1 | 7/2010 | Gandhewar et al. |
| 2010/0191839 A1 | 7/2010 | Gandhewar et al. |
| 2010/0214959 A1* | 8/2010 | Kuehnel ............. H04L 61/5046 370/255 |
| 2010/0218247 A1* | 8/2010 | Nice .................... H04L 61/5084 709/228 |
| 2010/0272107 A1 | 10/2010 | Papp et al. |
| 2010/0274924 A1* | 10/2010 | Allan .................. H04L 61/5014 709/245 |
| 2011/0004673 A1* | 1/2011 | Kitamura ............ H04L 61/5092 709/245 |
| 2011/0164505 A1 | 7/2011 | Salam et al. |
| 2012/0023207 A1* | 1/2012 | Gandhewar ......... H04L 61/5038 709/221 |
| 2012/0250627 A1 | 10/2012 | McCormack et al. |
| 2013/0286854 A1 | 10/2013 | Cao et al. |
| 2014/0044134 A1* | 2/2014 | Rajamanickam ... H04L 61/5046 370/400 |
| 2015/0095505 A1 | 4/2015 | Antony |
| 2015/0163192 A1 | 6/2015 | Jain et al. |
| 2015/0295884 A1* | 10/2015 | Zhao .................. H04L 61/5092 709/245 |
| 2016/0112367 A1* | 4/2016 | Thubert ............. H04L 61/5092 370/254 |
| 2016/0127193 A1* | 5/2016 | Deniaud ................ H04L 45/02 709/208 |
| 2016/0308825 A1 | 10/2016 | Jain et al. |
| 2017/0156052 A1* | 6/2017 | Yun .................... H04L 61/5092 |
| 2018/0063072 A1* | 3/2018 | Wackerly ............ H04L 61/5014 |
| 2020/0099654 A1 | 3/2020 | Jose et al. |

FOREIGN PATENT DOCUMENTS

| | | |
|---|---|---|
| CN | 102932491 A | 2/2013 |
| CN | 103685605 A | 3/2014 |
| CN | 108769290 A | 11/2018 |
| EP | 3382998 A1 | 10/2018 |
| JP | 2004356920 A | 12/2004 |
| WO | 03/055180 A1 | 7/2003 |
| WO | 03/081875 A1 | 10/2003 |
| WO | 2005050897 A2 | 6/2005 |

OTHER PUBLICATIONS

"Arp-scan User Guide," NTA-Wiki, Jun. 28, 2018, 13 pp.
"Change (Spoof) MAC Address on Windows 2000. XP, 2003, VISTA, 2008, Windows 7," KLC Consulting, Inc., accessed on Oct. 18, 2010, from http://www.klcconsulting.net/Change_MAC_w2k.htm, 8 pp.
"Change Mac Address," File Buzz, accessed on Oct. 18, 2010, from http://www.filebuzz.com/files/Change_Mac_Address/1.html, 4 pp.
"Gentle MAC Pro v4.0," File Buzz, accessed on Oct. 18, 2010, from http://www.filebuzz.com/fileinfo/32000/Gentle_MAC_Pro.html, 2 pp.
"IANA Considerations and IETF Protocol Usage," RFC 5342, IEEE, Network Working Group, Sep. 2008, 22 pp.
"IEEE Standard for Local and Metropolitan Area Networks, IEEE Std 802.1ag™-2007—Virtual Bridged Local Area Networks—Amendment 5: Connectivity Fault Management," IEEE Computer Society, LAN/MAN Standards Committee, Dec. 7, 2007, 260 pp.
"MacIP Change v1.0," File Buzz, accessed on Oct. 18, 2010, from http://www.filebuzz.com/fileinfo/36702/MacIP_Change.html, 2 pp.
"Subscriber Access Configuration Guide—Release 9.4," JUNOS® Software, Juniper Networks, Inc., Jan. 15, 2009, 38 pp.
"VM Server for SPARC 3.5 Administration Guide," Oracle, Nov. 2017, 474pp.
Alexander, "DHCP Options and BOOTP Vendor Extensions," RFC 2132, Network Working Group, IETF Standard, Internet Engineering Task Force, Mar. 1997, 35 pp.
Cheshire, "IPv4 Address Conflict Detection," Network Working Group, Request for Comments: 5227, Jul. 2008, 22 pp.
Droms et al., "Dynamic Heat Configuration Protocol for IPV6 (DHCPv6)," RFC 3315, Network Working Group, IETF Standard, Internet Engineering Task Force, Jul. 2003, 17 pp.
Droms, "Dynamic Host Configuration Protocol," RFC 2131, Network Working Group, IETF Standard, Internet Engineering Task Force, Mar. 1997, 46 pp.
Droms, R. and R. Cole, "An Inter-server Protocol for DHCP; draft-ietf-dhc-interserver-01.txt" Network Working Group, Internet Draft, Mar. 1997, p. 1-31.

(56) References Cited

OTHER PUBLICATIONS

Habets, "Arping," thomas@habets.pp.se, Jun. 21, 2003, 3 pp.
Habets, "Playing ARP—Draft,I repeat: It's a draft," thomas@habets.pp.se, Mar. 30, 2007, 7 pp.
Hinden et al,, "IP Version 6 Addressing Architecture," RFC 2373, IEEE, Network Working Group, Jul. 1998, 24 pp.
Hinden et al., "IP Version 6 Addressing Architecture," Network Working Group, Request for Comments: 4291, Feb. 2006, 26 pp.
Hladik, "linux—Fast ARP scan in address-less DAD (Duplicate Address Discovery) mode—Server Fault," Jul. 27, 2016, 2 pp.
McAuley et al. "Experience with Autoconfiguring a Network with IP Addresses", Proceedings: Communications for Network-Centric Operations: Creating the Information Force, Oct. 28-30, 2001, Mclean, VA, Telcordia Technologies, Inc., 2001, p. 272-276.
Moore, "Optimistic Duplicate Address Detection (DAD) for IPV6," Network Working Group, Request for Comments: 4429, Apr. 2006, 17 pp.
Narten et al., "Neighbor Discovery for IP Version 6 (IPv6)," Network Working Group, Request for Comments: 2461, Dec. 1998, 93 pp.
Narten et al., "Neighbor Discovery for IP version 6 (IPv6)," Network Working Group, Request for Comments: 4861, Sep. 2007, 97 pp.
Patrick, "DHCP Relay Agent Information Option," RFC 3046, Network Working Group, IETF Standard, Internet Engineering Task Force, Jan. 2001, 15 pp.
Prosecution History from U.S. Appl. No. 16/374,543, dated Jun. 18, 2020 through Nov. 25, 2020, 44 pp.
Prosecution History from U.S. Appl. No. 17/216,085, dated May 11, 2022 through Nov. 9, 2022, 63 pp.
Shin et al., "Simultaneous multi-DAD (SDAD) in Mobile IPV6," Department of Computer Engineering, Korea University, IEEE, date of conference: Nov. 13-16, 2008, 6 pp.
Thomas et al., "Detecting Hardware Address Conflicts in Computer Networks," U.S. Appl. No. 15/472,832, filed Mar. 29, 2017.
Thomson et al., "IPv6 Stateless Address Autoconfiguration," Network Working Group, Request for Comments: 4862, Sep. 2007, 31 pp.
U.S. Appl. No. 17/216,085, filed Mar. 29, 2021, naming inventors Nayak et al.
Wang et al., "Fast Duplicate Address Detection for Seamless Inter-Domain Handoff in AII-1Pv6 Mobile Networks," Wireless Personal Communications: 42(2), Jul. 2007, pp. 263-275.

* cited by examiner

| TYPE FIELD<br>52 | CODE FIELD<br>54 | CHECKSUM FIELD<br>56 |
|---|---|---|
| \multicolumn{3}{c}{RESERVED FIELD<br>58} |
| \multicolumn{3}{c}{TARGET GLOBAL IP ADDRESS FIELD<br>60} |
| \multicolumn{3}{c}{RANGE FOR POOL OF TARGET GLOBAL IP ADDRESSES FIELD<br>62} |

DUPLICATE ADDRESS DETECTION FOR RANGES OF GLOBAL IP ADDRESSES

This application is a continuation of U.S. application Ser. No. 17/216,085, filed Mar. 29, 2021, which is a continuation of U.S. application Ser. No. 16/374,543, filed Apr. 3, 2019 (now U.S. Pat. No. 10,965,637, issued Mar. 30, 2021), the entire contents of each of which are hereby incorporated by reference.

TECHNICAL FIELD

The techniques of this disclosure relate to computer networks and, more particularly, assignment of network addresses for use by network devices within computer networks.

BACKGROUND

A computer network is a collection of interconnected network devices that exchange data and share resources. The network devices may be implemented as physical devices, such as desktop computers, servers, and network appliances, or may be deployed as virtual devices, such as virtual machines executing on virtualization infrastructure. In some networks, such as Ethernet networks, each network interface of the virtual or physical network device is assigned a unique network address, such as an Internet protocol (IP) address. Network devices use IP addresses to determine network routes by which to send network traffic, such as packets, to network devices.

Network devices may use the Duplicate Address Detection (DAD) protocol to determine whether an Internet protocol (IP) address is likely to be unique on a particular link. That is, prior to assigning an IP address to a VM, a network device may send a neighbor solicitation message including the IP address to other network devices to determine whether any of the network devices have reserved the IP address. If one of the other network devices has the IP address reserved, that network device sends a neighbor advertisement message indicating that the IP address is reserved. Thus, if the network device receives such a neighbor advertisement message, the network device may select a different IP address and send a new neighbor solicitation message to the other network devices, and repeat this process until an unreserved IP address is discovered.

SUMMARY

In general, this disclosure describes techniques for assigning global Internet protocol (IP) addresses to network interfaces, in particular, by detecting and preventing conflicts between selected global IP addresses, in computer networks. As one example, in some cases, a network device may need to assign global IP addresses to multiple network interfaces in a short time span. This disclosure recognizes that sending individual neighbor solicitation messages for each of the global IP addresses may negatively impact the network, because the overhead associated with the messages and the number of messages may consume a relatively large amount of bandwidth, and also require substantial processing by network devices receiving the messages.

Thus, according to the techniques of this disclosure, a network device may send a single neighbor solicitation message specifying a range of requested global IP addresses for multiple network interfaces, as described herein. For example, the neighbor solicitation message may include data indicating that the neighbor solicitation message includes a range of requested global IP addresses, and data specifying the range of requested global IP addresses. The data specifying the range of requested global IP addresses may specify a first global IP address in the range and a number of global IP addresses in the range.

In one example, a method includes determining, by a network device, to assign a number of global Internet protocol (IP) addresses to respective network interfaces of a plurality of network interfaces of a plurality of network devices, the number of global IP addresses being greater than two, determining, by the network device, a subnetwork to which the plurality of network interfaces are to be assigned, determining, by the network device, a prefix corresponding to the subnetwork, determining, by the network device, a first global IP address having the prefix, determining, by the network device, a range value that is equal to or greater than the number of global IP addresses, generating, by the network device, a message according to Duplicate Address Detection Protocol (DAD) including data indicating that the message includes a range of addresses, the data further indicating the first global IP address and the range value; and sending, by the network device, the message according to DAD to one or more host network devices to determine whether any global IP address in a range starting with the first global IP address and through the range value is in use by the one or more host network devices.

In another example, a network device includes a network interface implemented in circuitry; and a processor implemented in circuitry and configured to determine to assign a number of global Internet protocol (IP) addresses to respective network interfaces of a plurality of network interfaces of a plurality of network devices, the number of global IP addresses being greater than two; determine a subnetwork to which the plurality of network interfaces are to be assigned; determine a prefix corresponding to the subnetwork; determine a first global IP address having the prefix; determine a range value that is equal to or greater than the number of global IP addresses; generate a message according to Duplicate Address Detection Protocol (DAD) including data indicating that the message includes a range of addresses, the data further indicating the first global IP address and the range value; and send, via the network interface, the message according to DAD to one or more host network devices to determine whether any global IP address in a range starting with the first global IP address and through the range value is in use by the one or more host network devices.

In another example, a computer-readable storage medium has stored thereon instructions that, when executed, cause a processor of a network device to determine to assign a number of global Internet protocol (IP) addresses to respective network interfaces of a plurality of network interfaces of a plurality of network devices, the number of global IP addresses being greater than two; determine a subnetwork to which the plurality of network interfaces are to be assigned; determine a prefix corresponding to the subnetwork; determine a first global IP address having the prefix; determine a range value that is equal to or greater than the number of global IP addresses; generate a message according to Duplicate Address Detection Protocol (DAD) including data indicating that the message includes a range of addresses, the data further indicating the first global IP address and the range value; and send the message according to DAD to one or more host network devices to determine whether any global IP address in a range starting with the first global IP address and through the range value is in use by the one or more host network devices.

The details of one or more embodiments of the techniques are set forth in the accompanying drawings and the description below. Other features, objects, and advantages of the techniques will be apparent from the description, drawings, and claims.

DETAILED DESCRIPTION

Figure 1:
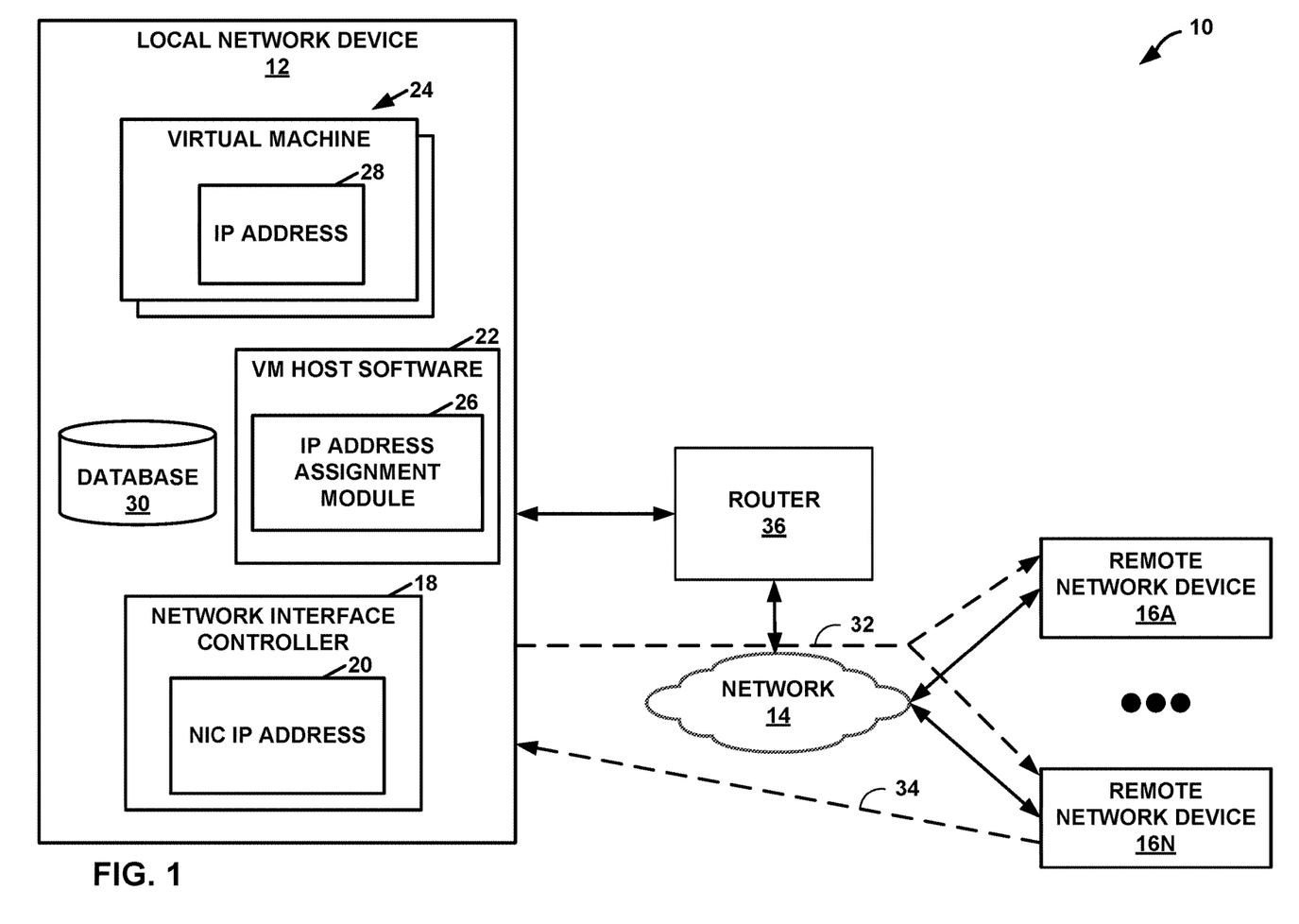
FIG. 1 is a block diagram illustrating an example network system in which a local network device implements network layer address conflict detection techniques of this disclosure.

FIG. 1 is a block diagram illustrating an example network system 10 in which a local network device 12 implements network layer address conflict detection techniques of this disclosure. The network layer address conflict detection techniques may be applied to detect, for example Internet protocol (IP) address conflicts. As shown in FIG. 1, network system 10 comprises local network device 12, router 36, a network 14, and remote network devices 16A-16N (collectively, "remote network devices 16"). Local network device 12 is "local" in the context of this disclosure in the sense that this disclosure describes local network device 12 as being an initiating device of the IP address conflict detection techniques of this disclosure. Likewise, remote network devices 16 are "remote" in the context of this disclosure in the sense that remote network devices 16 are remote from local network device 12. As described in more detail, local network device 12 is an example of a requesting network device, and remote network devices 16 are examples of responding network devices. Local network device 12 and remote network devices 16 may also be referred to as "host network devices."

Local network device 12 may comprise various types of computing devices. For example, local network device 12 may comprise a server computer, a blade server, a personal computer, a mobile computing device (e.g., a tablet computer, smartphone), an intermediate network device (e.g., a router, gateway, intrusion detection device), or another type of network-equipped computing device. Remote network devices 16 each may comprise similar types of network-equipped computing devices.

Network 14 may comprise various devices and network links that facilitate communication among local network device 12 and remote network devices 16. For instance, network 14 may comprise one or more hubs, repeaters, and/or switches. Network 14 comprises an Ethernet network or other type of network that supports broadcast communication to all network devices connected to network 14 and relies on each device having a unique address. For ease of explanation, this disclosure primarily discusses network 14 as an Ethernet network.

As shown in the example of FIG. 1, local network device 12 comprises a network interface controller (NIC) 18. NIC 18 comprises a computer hardware component that connects local network device 12 to network 14. In some examples, NIC 18 is built into a motherboard of local network device 12. NIC 18 has a NIC IP address 20. For instance, IP address 20 may be stored in a memory unit (e.g., a read only memory (ROM) unit, programmable read only memory (PROM), electrically-erasable programmable read only memory (EEPROM)) of NIC 18. In other examples, other network layer addresses maybe substituted for NIC IP address 20. NIC IP address 20 may be assigned by a dynamic host configuration protocol (DHCP) server (not shown).

When communicating on network 14, a network device may transmit a message (hereinafter referred to as a "packet") that specifies a source IP address, a destination IP address, a source port, a destination port, and a protocol. The source IP address of the packet is the IP address of the transmitting network device, while the destination IP address of the packet is the IP address of the network device to which the packet is being sent. Sending the source IP address in the packet may allow a receiving network device to respond by sending a packet back to the initial transmitting device, as well as to determine appropriate network routes by which to forward the packet. The destination IP address of a frame identifies an intended receiver of the packet. The protocol field of a packet identifies a communication protocol of the payload of the packet.

Furthermore, as shown in the example of FIG. 1, local network device 12 may comprise virtual machine (VM) host software 22. VM host software 22 may comprise various types of software systems that host VMs 24. For example, VM host software 22 may comprise an operating system. In another example, VM host software 22 may comprise a hypervisor.

In this disclosure, VM host software 22 and an IP address assignment module (IAAM) 26 of VM host software 22 may execute on processing circuitry of local network device 12, and may configure the processing circuitry to perform the example techniques described in this disclosure. For example, memory of local network device 12 may store computer-readable instructions for VM host software 22 and IAAM 26 that the processing circuitry retrieves and executes. In some examples, the processing circuitry loads the instructions to become configured to perform the example operations described in this disclosure. In some examples, the processing circuitry may be a combination of fixed-function circuitry (e.g., having immutable operations) and programmable circuitry. For example, the processing circuitry may include one or more processors, and the processors will include programmable cores and fixed-function circuitry, as one example.

In general, each of VMs 24 is an emulation of a respective computer system. Since each of VMs 24 emulates a respective computer system, each of VMs 24 should have a respective IP address for use in communicating on network 14. Accordingly, IAAM 26 may assign a respective IP address 28 to each respective VM 24. Subsequently, when NIC 18 receives a packet specifying an IP address of a VM as the destination address, VM host software 22 accepts the frame and forwards the frame to the VM. When a VM generates a frame for transmission on network 14, the frame specifies the IP address of the VM as the source address of the frame. VM host software 22 then passes the frame to NIC 18 for transmission on network 14.

Local network device 12 may generally construct global IP addresses for multiple interfaces of VMs 24 according to, e.g., Section 5.5 of Thomson et al., "IPv6 Stateless Address Autoconfiguration," Network Working Group, Request for Comments (RFC) 4862, September 2007, the entire contents of which are hereby incorporated by reference. However, rather than performing duplicate address detection for each interface one at a time, local network device 12 may determine whether a range of global IP addresses is reserved according to the techniques of this disclosure.

In general, routers in a multicast domain periodically send router advertisement messages to an all-nodes multicast address associated with the multicast domain. To obtain a router advertisement message quickly, a host device (such as local network device 12) may send a router solicitation message.

Local network device 12 may determine that a plurality of network interfaces are to be assigned to a common subnetwork (subnet). Local network device 12 may send a router solicitation message to router 36. The router solicitation message may prompt router 36 to send a router advertisement message back to local network device 12. The router advertisement message may specify prefix information associated with the subnet. For example, the router advertisement message may specify the prefix in prefix information options contained in the router advertisement. Accordingly, local network device 12 may construct global IP addresses including data representing the prefix associated with the subnet and network interface identifiers for the network interfaces. In particular, local network device 12 may form a global address by appending the interface identifier to the prefix of an appropriate length. For example, a first number of bits of an N-bit field of global address may specify the link prefix, and the remaining number of bits of the N-bit field may specify the interface identifier. Additional details regarding construction of a global address are described in Section 5.5 of RFC4862.

As previously discussed, according to the duplicate address detection (DAD) protocol, a network device typically determines whether individual global IP addresses are reserved one at a time. Details regarding the use of DAD are described in, e.g., Jose et al., "AUTOMATIC RECOVERY FROM DUPLICATE NETWORK ADDRESSES," U.S. application Ser. No. 16/138,767, filed Sep. 21, 2018, the entire contents of which are hereby incorporated by reference. DAD is also described in RFC 4862. However, determining whether global IP addresses are duplicates each time a new VM is spun-up can be time intensive and negatively impact the amount of time the VMs need to wait before being able to transmit and receive communication. In accordance with one or more examples of this disclosure, a requesting network device determines whether a plurality of global IP addresses is available to be reserved with a single request, thereby reducing the amount of time needed reserve global IP addresses.

There may be a one-to-one mapping between the interface identifier and MAC address. Since a link prefix is the same, all global IP addresses for a subnet may be dependent on interface identifiers to generate different IP addresses.

For VMs, an IFL index may be used to generate the interface identifier. IP global addresses may be in a range because the IFL indexes are in some range between 0 and 64k. Conventionally, when an interface is enabled, a host device sends router solicitations to determine a prefix for the subnet that is configured for the interface. However, according to the techniques of this disclosure, local network device 12 may send router solicitation messages in advance for all expected subnets and get the prefixes for each of the subnets and stores those prefixes, e.g., in database 30. Local network device 12 may club these prefixes with interface identifiers to generate global IP addresses. Since there is a one-to-one mapping between interface identifier and MAC address, local network device 12 can use DAD to detect duplicate global IP addresses from a group (range) of global IP addresses using a single DAD packet, according to the techniques of this disclosure. Then these global IP addresses are readily available for new VMs or IFLs.

Conventionally when a new VM interface is enabled or an IFL is enabled in a router, router solicitation messages are used to fetch the prefix, a global IP address is generated, DAD is executed to check if the global IP address is a duplicate or not, and until an unused global IP address is detected, the interface remains in tentative mode and cannot accept network packets. Using the techniques of this disclosure, the prefix is collected in advance, and DAD is run to check if a range of global IP addresses are duplicates or not. This technique is much faster than the conventional techniques of determining duplicates one by one. Thus, the techniques of this disclosure both improve performance of local network device 12 and the field of initializing network devices (e.g., assigning IP addresses to the network devices) generally, because fewer router solicitation messages, neighbor solicitation messages, and neighbor advertisement messages can be sent to determine a range of unused global IP addresses. Thus, less bandwidth is consumed, and fewer processing cycles are expended, to determine a range of unused global IP addresses, according to the techniques of this disclosure.

As noted above, local network device 12 may execute multiple (e.g., two or more) VMs 24. In some cases, local network device 12 may begin execution of multiple VMs 24 (sometimes referred to as "spinning up" the VMs) simultaneously, i.e., generally (approximately) concurrently in time so that the operations overlap, or are close to overlapping, in time, such as within a few seconds or minutes of each other. Rather than determining whether potential global IP addresses for the newly executed VMs are unique one-by-one as conventionally performed using, e.g., duplicate address detection (DAD), local network device 12 may perform the techniques of this disclosure to determine whether a range of global IP addresses for the multiple network interfaces of multiple VMs 24 is reserved, e.g., by any of remote network devices 16. Furthermore, local network device 12 reserves the range of global IP addresses for VMs 24 after having determined that the range of global IP addresses are not currently reserved.

This disclosure describes an enhancement to DAD protocol that may detect the presence of duplicate global IP addresses being present in a network. For instance, in one or more examples, a requesting network device may, with a single request, reserve a plurality of global IP addresses that the requesting network device determined are not duplicate global IP addresses.

In this way, when new VMs are spun-up (e.g., instantiated), the requesting network device (e.g., local network device 12) can assign the new VMs global IP addresses from the reserved plurality of global IP addresses, without needing to determine whether the global IP addresses that are to be assigned to the network interfaces of the VMs are duplicates.

As one example, assume VM host software 22 is to instantiate three VMs 24. In previous techniques, IAAM 26 would select global IP addresses for each of the three VMs 24, and determine whether the three selected global IP addresses are unique or are duplicates of reserved global IP addresses. According to the techniques of this disclosure, local network device 12 may send a single message (e.g., single neighbor solicitation message 32) specifying a first one of the global IP addresses and a range of the global IP addresses and send this message to remote network devices 16. Local network device 12 may use any responses from remote network device 16 to this message to determine whether any of the global IP addresses in the range is reserved. In some examples, remote network devices 16 may release a previously reserved global IP address if the previously reserved global IP address is no longer needed. Remote network devices 16 may send neighbor advertisement messages, such as neighbor advertisement message 34, specifying one or more reserved global IP addresses and/or one or more released global IP addresses in response to the message from local network device 12.

Furthermore, local network device 12 may use these techniques to reserve a number of global IP addresses in advance of actually needing the IP addresses for assignment to network interfaces of VMs 24. For example, when local network device 12 (which may be a router) configures thousands of IFLs and generates interface identifiers for those IFLs using a combination of MAC address and IFL index, local network device 12 can assign the new IFLs global IP addresses from the reserved plurality of global IP addresses without needing to determine whether the global IP addresses that are to be assigned to the IFLs are duplicates.

Determining whether global IP addresses are duplicates each time a router configures IFLs can be time intensive and negatively impact the amount of time the IFLs need to wait before being able to transmit and receive communication. In accordance with one or more examples of this disclosure, local network device 12 determines whether a plurality of global IP addresses is available to be reserved with a single request, thereby reducing the amount of time needed to reserve global IP addresses.

In some examples, neighbor solicitation and neighbor advertisement messages may generally conform to the format of, e.g., Narten et al., "Neighbor Discover for IP version 6 (IPv6)," Network Working Group, RFC 4861, September 2007, available at tools.ietf.org/html/rfc4861. According to RFC 4861, such messages include, inter alia, a type field and a code field. The type field of a neighbor solicitation message per RFC 4861 is a value of "135," while the type field of a neighbor advertisement message per RFC 4861 is a value of "136." RFC 4861 defines neighbor solicitation and neighbor advertisement messages for a single IP address as having a code value of "O."

In accordance with the techniques of this disclosure, local network device 12 may form neighbor solicitation message 32 including data that specifies that neighbor solicitation message 32 includes a range of global IP addresses, e.g., by setting the value of the code field to a value other than "0," e.g., 1, 2, 3, etc. Likewise, in accordance with the techniques of this disclosure, local network device 12 may determine that a neighbor advertisement message having a value other than "0," e.g., of 1, 2, 3, etc., in a code field thereof is a neighbor advertisement message, such as neighbor advertisement message 34, in response to neighbor solicitation message 32 including a range of global IP addresses, and that neighbor advertisement message 34 indicates one or more global IP addresses that are currently reserved by one of remote network devices 16.

Furthermore, neighbor advertisement message 34 may, additionally or alternatively, specify one or more previously reserved global IP addresses that are being released by one of remote network devices 16. In some examples, different code field values specify whether the neighbor advertisement message specifies one or more reserved global IP addresses, one or more released global IP addresses, or both one or more reserved global IP addresses and one or more released global IP addresses. As one example, a value of "1" for the code field may indicate that neighbor advertisement message 34 specifies one or more reserved global IP addresses, a value of "2" for the code field may indicate that neighbor advertisement message 34 specifies one or more released global IP addresses, and a value of "3" for the code field may indicate that neighbor advertisement message 34 specifies one or more reserved global IP addresses and one or more released global IP addresses.

Network devices such as local network device 12 send neighbor solicitation messages, such as neighbor solicitation message 32, to remote network devices 16 to determine whether global IP addresses of a target node are duplicates or not. Local network device 12 may multicast such neighbor solicitation messages to a multicast group including remote network devices 16 when local network device 12 needs to resolve the global IP addresses. Thus, before sending neighbor solicitation message 32, local network device 12 may join the all-nodes multicast address and the solicited-node multicast address of the target address. The former may ensure that local network device 12 receives neighbor advertisements from other nodes already using the address, while the latter may ensure that two nodes attempting to use the same address simultaneously should detect each other's presence.

Local network device 12 may iteratively determine global IP addresses that are not currently reserved by any of remote IP addresses 16 by using such neighbor solicitation and neighbor advertisement messages. For example, local network device 12 may, in response to an indication of a reserved IP address, generate a new neighbor solicitation message starting from a new IP address that is not currently reserved for the full range as previously requested. Alternatively, local network device 12 may determine a portion of the previously requested range of global IP addresses that is not reserved (or previously reserved and released), and submit a new neighbor solicitation message for a smaller range of global IP addresses that were reserved and not released.

In a first step, IAAM 26 generates a request message specifying NIC IP address 20. IAAM 26 also includes a target IP address and a range of target IP addresses. The target IP address may be a IP address that IAAM 26 plans to reserve for assigning to one of VMs 24, and the range of global IP addresses may be N number of consecutive IP addresses, where N is a number greater than or equal to 1. The target IP address may be the starting IP address of the range of global IP addresses. As one example, the target IP address is 0, and the range is 64, meaning that IAAM 26 plans to reserve IP addresses 0 to 63.

As another example, IAAM 26 specifies the starting and ending IP addresses (e.g., IP address 10 to 19). This example is another way in which IAAM 26 specifies a range of global IP addresses starting from a target IP address. For instance, in this example, the target IP address is 10 and the range is 10. There may be other ways in which to specify a range of global IP addresses staring from a target IP address, and the example techniques are not limited to the specific examples provided above.

There may be various ways in which IAAM 26 determines the target IP address and the range of global IP addresses. As one example, IAAM 26 determines the target IP address using a random number generator for the last two bytes, and the first six bytes are based on manufacturer of NIC 20 or based on pre-configuration of VM host software 22. IAAM 26 may be pre-configured with a value of N that defines the consecutive IP addresses IAAM 26 should reserve (e.g., N is pre-configured as 64 or 256). As another example, VM host software 22 may track a rate of how many VMs 24 are being spun-up and how many VMs 24 are being brought down, and IAAM 26 may determine the value of N based on the tracked rate. If on average, based on the tracked rate, X number of VMs 24 are executing on local network device 12, then IAAM 26 may determine a value of N that is greater than or equal to X. There may be other ways in which to determine the range of the IP addresses, and the example techniques are not limited to the above examples.

For instance, physical configuration of local network device 12 allows creation of a certain number of VMs 24 with a specified number of virtual network interface controllers for each VM 24. These configurations are based on the number of physical network interface controllers 18 and capacity of each physical network interface controller 18 in terms of bandwidth.

A Network Administrator of local network device 12 may determine how many VMs 24 need to be created with certain number of virtual network interface controller for each VM 24 to achieve successful operation of VMs 24 for a pre-defined load.

For example, local network device 12 has two physical network interface controllers 18 and each physical Network interface controller 18 capacity is 8 Gbs (Gibabits per second). So total network capacity available with local network device 12 is 16 Gbs. If each of the VMs 24 is expected to own 2 Gbs network capacity to execute a predefined operation then 8 VMs 24 can be created out of a single local network device 12. Each of these 8 VMs 24 can have one Virtual network interface controller. Therefore, the total number of virtual interface controllers is 8. In this example, suppose number of virtual network interface controller decided for a local network device 12 is X. Then X number of global IP addresses need to be reserved by IAAM 26. However actual VMs 24 in operation at certain point of time may be less than the total number of VMs 24 created on local network device 12. These VMs 24 use less number of Virtual network interface controller, which is less than X.

IAAM 26 then instructs NIC 18 to send, via network 14, a packet comprising the request message and having a destination address field specifying Solicited-Node Multicast address, as mentioned in the RFC 4861. Thus, each network device connected to network 14 (e.g., remote network devices 16, already configured VMs 24) and joined to Solicited-Node Multicast address may receive and accept the packet. In some examples, a source IP address field of the packet may specify unspecified address::/0, as mentioned in the RFC 4861.

In response to receiving the frame, a network device determines whether a IP address or group of consecutive IP addresses of the network device matches IP addresses in the range of global IP addresses. As an example, remote network device 16A may have reserved IP addresses for assigning to the VMs that execute on remote network device 16A. In this example, the IAAM of remote network device 16A may determine whether any of the IP addresses reserved for VMs that execute on remote network device 16A are within the range of global IP addresses specified by IAAM 26. For instance, the IAAM of remote network device 16A may determine whether a group of consecutive IP addresses, which are part of the IP addresses reserved by remote network device 16A, are within the range of global IP addresses specified by local network device 12.

In response to determining that remote network device 16A reserved a group of global IP addresses within the range of addresses specified in the request message, remote network device 16A generates a response message. In one example, the response message specifies a range of global IP addresses starting from a response IP address that are reserved by remote network device 16A. The range of global IP addresses starting from the response IP address partially or fully overlap the range of global IP addresses starting from the target IP address specified by local network device 12.

As an example, local network device 12 may specify the target IP address as 10 and the range of global IP addresses as 10 (e.g., local network device 12 is reserving addresses 10 to 19). Remote network device 16A may determine that remote network device 16A had previously reserved IP addresses 5 to 24. In this example, remote network device 16A determines that the IP addresses reserved by remote network hardware device 16A partially or fully (fully, in this example) overlap the IP address range of 10 to 19, requested to be reserved by local network device 12. In this example, remote network device 16A generates a response message indicating that remote network device 16A reserved IP addresses 5 to 24.

In some examples, although remote network device 16A reserved IP addresses that fully or partially overlap the range of global IP addresses starting from the target IP address requested by local network device 12, remote network device 16A may determine that some of the overlapping IP addresses can be released for use by local network device 12. For instance, keeping with the previous example, remote network device 16A may determine that remote network device 16A can release IP addresses 10 to 14, so that remote network device 16A would still reserve IP addresses 5-9 and 15-24, but 10-14 would be available for local network device 12. In this example, remote network device 16A generates a response message indicating that remote network device 16A is releasing IP addresses 10-14 and keeping in reserve IP addresses 5-9 and 15-24.

Local network device 12 may utilize various factors to determine which ones and how many reserved addresses can be released. Assume that IAAM 26 reserved X number of addresses. As one example, VM host software 22 may track a rate of how many VMs 24 are being spun-up and how many VMs 24 are being brought down, and IAAM 26 may determine the value of N based on the tracked rate. If on average, based on the tracked rate, N number of VMs 24 are executing on local network device 12, then (X−N) of global IP address can be released by IAAM 26.

For example, X is max number of VMs 24 designed for local network device 12, and X number of global IP addresses are reserved by IAAM 26. However actual VMs 24 in operation at certain point of time is less than the total number of VMs 24 created on local network device 12. So these VMs 24 uses less number of Virtual network interface controller than X. Accordingly, IAAM 26 may release (X−N) IP addresses.

Remote network device 16A then sends, on network 14, a packet comprising the response message. In some examples, a destination IP address of the packet specifies the Solicited-Node Multicast address. In some examples, the node that receives the Neighbor Solicitation and that has an interface address that matches the target address in the received Neighbor Solicitation, may send a neighbor Advertisement back by setting the destination address to the tentative address or target address. An IP address remains in tentative address or tentative state until the IP address is verified to be non-duplicate one through Neighbor Solicitation message. On the other hand, in response to determining that none of the IP addresses reserved by remote network device 16A are within the range of the IP addresses specified by local network device 12, remote network device 16A does not generate a response message.

Thus, if any node (e.g., any of remote network devices 16, such as remote network device 16N) receives neighbor solicitation message 32 specifying a range of global IP addresses and has one or more interface addresses that match one or more address in the range, remote network device 16N may send a neighbor advertisement message (such as neighbor advertisement message 34) back. In particular, remote network device 16N may set the target address and the destination address of neighbor advertisement message 34 to the matching, tentative address. Remote network device 16N may set the target address of neighbor advertisement message 34 to the first matching global IP address in the range, and a range value for a range of IP addresses starting with the first matching global IP address that all match IP addresses in the range of the neighbor solicitation message. Thus, local network device 12 (acting as the neighbor solicitation message 32 originating node, in this example), upon receipt of neighbor advertisement message 34, can determine tentative global IP addresses that are duplicates and cannot be used if both the target address and the destination address of neighbor advertisement message 34 are the same. In some examples, if the target address and the destination address are not the same, then the target address and the range of IP addresses starting from the target address cannot be used.

If IAAM 26 does not receive a response message specifying a range of global IP addresses that partially or fully overlap the range of global IP addresses starting with the target IP address specified by IAAM 26, IAAM 26 may determine that all IP addresses within the range of global IP addresses starting with the target IP address are available (e.g., not duplicative). IAAM 26 may then reserve all IP addresses within the range of global IP addresses starting with the target IP address (e.g., store information indicating the reserved IP addresses in database 30).

If IAAM 26 receives one or more response messages that together specify that all addresses specified by IAAM 26 are reserved by other network devices, IAAM 26 may select a new, different target Internet protocol (IP) address, and perform the examples of the above procedure with the new target IP address. For instance, assume IAAM 26 specified 64 IP addresses. It is possible that remote network device 16A had reserved 10 IP addresses that overlap the 64 IP addresses specified by IAAM 26, and remote network device 16A may have send a response message indicating the 10 IP addresses. Remote network device 16B may have reserved 54 IP addresses that overlap the 64 IP addresses specified by IAAM 26, and remote network device 16B may have send a response message indicating the 54 IP addresses. It is also possible that either one of remote network device 16A or 16B had reserved all of the 64 IP addresses specified by local network device 12. In either example, local network device 12 may determine that none of the 64 IP addresses local network device 12 specified are available. Local network device 12 may start with a new, different target IP address and repeat the above example procedures.

In some examples, IAAM 26 receives one or more response messages that specify a group of global IP addresses that overlap with the range of global IP addresses specified by local network device 12. For instance, remote network device 16A may send a response message indicating that 10 IP addresses overlap the 64 IP addresses specified by local network device 12, and remote network device 16B may not send any response. In this example, local network device 12 may reserve the 54 non-overlapping IP addresses (e.g., a subset of the IP addresses specified by local network device 12). IAAM 26 may determine whether additional IP addresses are needed, and if needed, repeat the above procedure starting from a new target IP address.

In some examples, IAAM 26 receives one or more response message that specify a group of global IP addresses that overlap with the range of global IP addresses specified by local network device 12, but further specify a group of global IP addresses being released by the responding network device. For example, remote network device 16A may release some of the IP addresses that remote network device 16A has reserved that are within the range of global IP addresses specified by local network device 12. Local network device 12 may reserve those IP addresses released by remote network device 16A.

Although the above examples are described with respect to remote network device 16A, the other network devices on network system 10 operate similarly. For instance, remote network device 16B operates similarly to remote network device 16A. Also, the techniques are described with respect to local network device 12. However, the techniques described in this disclosure may be performed by any and all of the network devices of network system 10. For instance, from perspective of remote network device 16A, remote network device 16A is a local network device, and local network device 12 is a remote network device.

Moreover, although described with respect to network interfaces of VMs 24, the network interfaces may be of physical network devices, rather than virtual machines, or the network interfaces may be for a combination of both physical and virtual machines.

Thus, in the example of FIG. 1, a network device (e.g., local network device 12) may determine to assign a number of global Internet protocol (IP) addresses to respective network interfaces of a plurality of network interfaces of a plurality of network devices, the number of global IP addresses being greater than two. The network device may also determine a subnetwork to which the plurality of network interfaces are to be assigned. The network device may then determine a prefix corresponding to the subnetwork. The network device may also determine a first global IP address having the prefix. The network device may further determine a range value that is equal to or greater than the number of global IP addresses. Next, the network device may generate a message according to Duplicate Address Detection Protocol (DAD) including data indicating that the message includes a range of addresses, the data further indicating the first global IP address and the range value. The network device may then send the message according to DAD to one or more host network devices to determine whether any global IP address in a range starting with the first global IP address and through the range value is in use by the one or more host network devices.

Furthermore, in the example of FIG. 1, a network device (e.g., local network device 12, one of remote network devices 16) may receive a request message specifying a range of global IP addresses starting from a target IP address. The network device may determine whether a group of consecutive global IP addresses of the network device match a subset of the range of global IP addresses. In response to determining that the group of consecutive IP addresses of the network device match the subset of the range of global IP addresses, the network device may send a response message specifying the group of consecutive IP addresses and indicating whether these global IP addresses remain reserved, are being released, or a combination thereof.

In the example of FIG. 1, local network device 12 includes database 30. Database 30 may store data indicating reserved global IP addresses of network devices connected to network 14, e.g., global IP addresses reserved by remote network devices 16. VM host software 24 (e.g., IAAM 26) may add entries to database 30 specifying global IP addresses in response to receiving response messages specifying the IP addresses, in response to successfully reserving IP addresses for VMs 24, or in response to other events.

Figure 2:
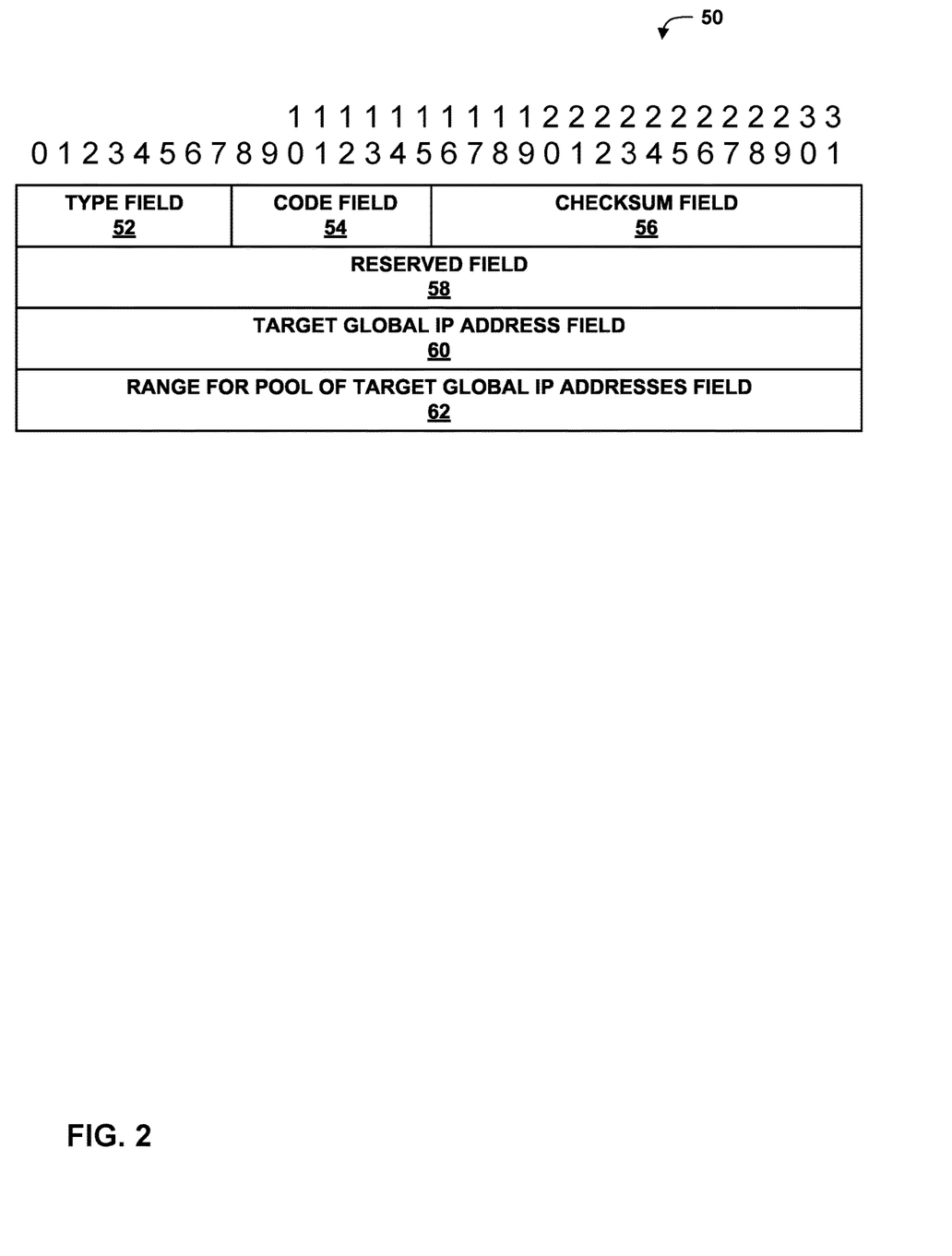
FIG. 2 is a conceptual diagram illustrating an example neighbor solicitation message format, in accordance with one or more techniques of this disclosure.

FIG. 2 is a conceptual diagram illustrating an example neighbor solicitation message format 50, in accordance with one or more techniques of this disclosure. Neighbor solicitation message 32 of FIG. 1 may conform to neighbor solicitation message format 50. As shown in FIG. 2, neighbor solicitation message format 50 includes type field 52, code field 54, checksum field 56, reserved field 58, target global IP address field 60, and range for pool of target global IP addresses field 62. Neighbor solicitation messages conforming to neighbor solicitation message format 50 of FIG. 2 may be ICMP V6 messages, including an IP header (not shown). The IP header may include a source address, which is either an address assigned to the interface from which this message is sent or (if Duplicate Address Detection is in progress) the unspecified address, and a destination address, which is either the solicited-node multicast address to the target address, or the target address. The IP header may also specify a hop limit of 255.

In one example, type field 52 has a value of "135," code field 54 has a value of "1," "2," or "3," and checksum field 56 has a value representing an ICMP checksum. Reserved field 58 represents a field that is reserved for later use, e.g., for additional extensions. In one example, the value of reserved field 58 must be initialized to zero and ignored by a receiving device. Target global IP address field 60 has a value representing a global IP address of a target of a neighbor solicitation message. Range for pool of target global IP addresses field 62 has a value representing a range of global IP addresses starting from the target global IP address specified in target global IP address field 60.

Accordingly, local network device 12 may construct a neighbor solicitation message conforming to neighbor solicitation message format 50 of FIG. 2. That is, local network device 12 may construct a neighbor solicitation message including a value of "135" for type field 52, a value of "1" for code field 54 (indicating that the neighbor solicitation message specifies a range of global IP addresses), a checksum value in checksum field 56, and a value of zero for reserved field 58. Local network device 12 may also determine a first IP address in a range of global IP addresses to be reserved for a plurality of VMs 24 that are to be spun up. Local network device 12 may assign the value of the first IP address to target global IP address field 60 and a value representing the range to range for pool of target global IP addresses field 62.

Figure 3:
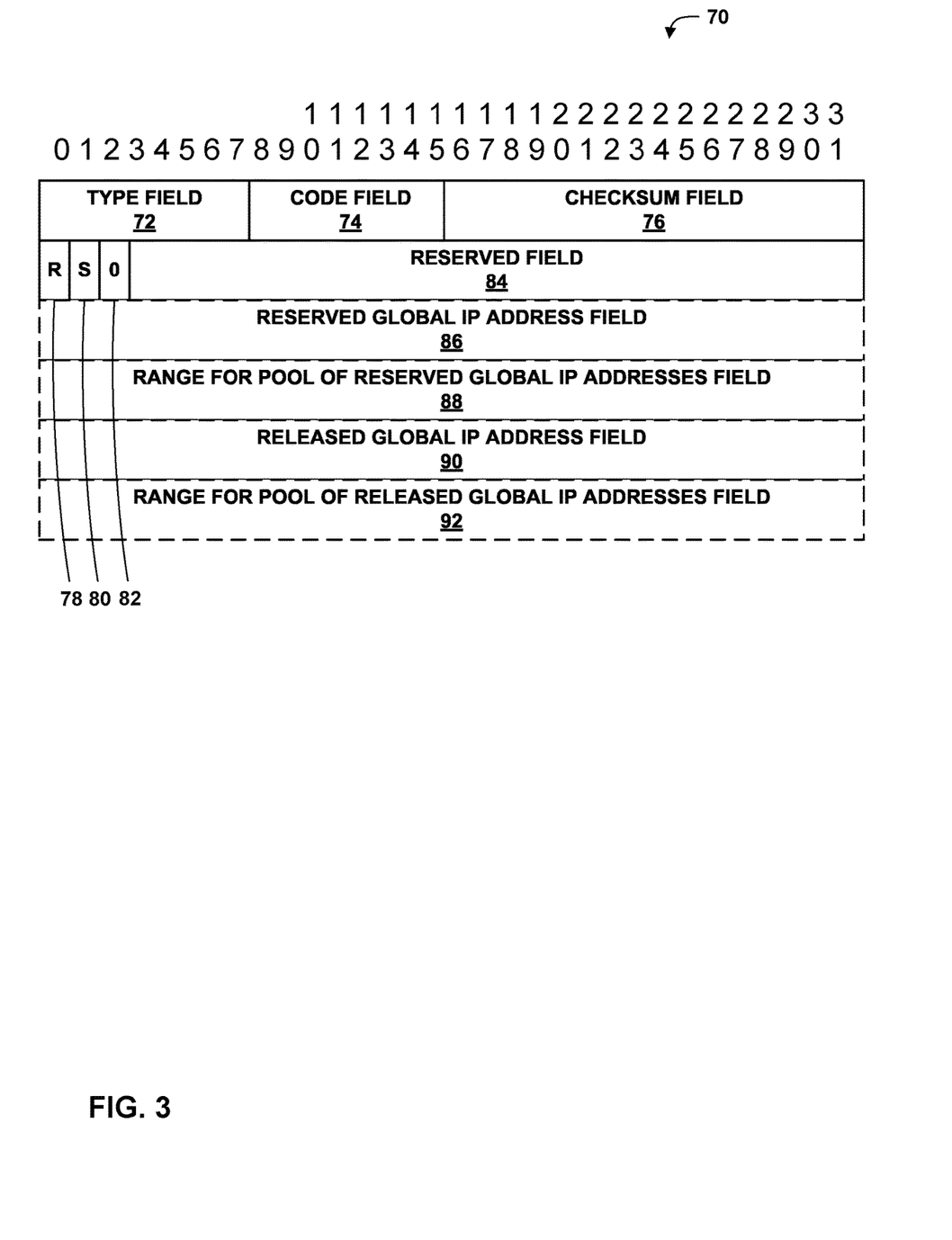
FIG. 3 is a conceptual diagram illustrating an example neighbor advertisement message format, in accordance with one or more techniques of this disclosure.

FIG. 3 is a conceptual diagram illustrating an example neighbor advertisement message format 70, in accordance with one or more techniques of this disclosure. Neighbor advertisement message 34 of FIG. 1 may conform to neighbor advertisement message format 70. Neighbor advertisement message format 70 of FIG. 3 includes type field 72, code field 74, checksum field 76, router flag (R) field 78, solicited flag (S) field 80, override flag (O) field 82, reserved field 84, reserved global IP address field 86, range for pool of reserved global IP addresses field 88, released global IP address field 90, and range for pool of released global IP addresses field 92. Reserved global IP address field 86, range for pool of reserved global IP addresses field 88, released global IP address field 90, and range for pool of released global IP addresses field 92 are illustrated with dashed outlines, representing that these fields are optional. Neighbor advertisement messages conforming to neighbor advertisement message format 70 of FIG. 3 may be ICMP V6 messages, including an IP header (not shown). The IP header includes a source address, which includes an address assigned to the interface from which the advertisement is sent, and a destination address. For solicited advertisements, the source address of an invoking Neighbor Solicitation or, if the solicitation's Source Address is the unspecified address, the all-nodes multicast address. The IP header may also include a hop limit of 255.

In one example, type field 72 has a value of "136," code field 74 has a value of "1," "2," "3," or some other value, and checksum field 76 has an ICMP checksum value. In particular, code field 74 has a value that indicates whether reserved global IP address field 86 and range for pool of reserved global IP addressed field 88 are included, released global IP address field 90 and range for pool of released global IP addressed field 92 are included, or each of reserved global IP address field 86, range for pool of reserved global IP addresses field 88, released global IP address field 90, and range for pool of released global IP addresses field 92 are included.

When set, the value of R field 78 indicates that the sender is a router. The value of R field 78 may be used by devices performing Neighbor Unreachability Detection to detect a router that changes to a host. When set, the value of S flag 80 indicates that the advertisement was sent in response to a neighbor solicitation from the destination address. S flag 80 may be used as a reachability confirmation for Neighbor Unreachability Detection. S flag 80 may not be set in multicast advertisements or in unsolicited unicast advertisements. When set, the value of O flag 82 indicates that the advertisement should override an existing cache entry and update the cached link-layer address. When the value of O flag 82 is not set, the advertisement will not update a cached link-layer address, though it will update an existing Neighbor Cache entry for which no link-layer address is known. The value of O flag 82 may not be set in solicited advertisements for anycast addresses and in solicited proxy advertisements. The value of O flag 82 may be set in other solicited advertisements and in unsolicited advertisements.

Reserved field 84 is a 29-bit field in the example of FIG. 3. Reserved field 84 has a value of zero in some examples and is reserved for future use. Local network device 12 may ignore the value of reserved field 84.

Reserved global IP address field 86 has a value that specifies a global IP address that one of remote network devices 16 has already reserved. Upon receiving a neighbor solicitation message, the one of remote network devices 16 may send a neighbor advertisement message to informs other hosts (e.g., local network device 12 and other remote network devices 16) that such address is not available for use.

Range for pool of reserved global IP addresses field 88 has a value that specifies a set of addresses starting from the value of reserved global IP address field 86. Remote network devices 16 may use this field to inform other hosts (e.g., local network device 12 and other remote network devices 16) that the set of global IP addresses are not available for use in a single neighbor advertisement message. Reserved global IP address field 86 and range for pool of reserved global IP addresses field 88 are optional and included according to a value of code field 74.

Released global IP address field 90 has a value that specifies a global IP address that a host (e.g., one of remote network devices 16) plans to release. Upon receiving a neighbor advertisement message, local device 12 that originally sent the neighbor solicitation message can reserve such released global IP address for future usage.

Range for pool of released global IP addresses field 92 has a value that specifies a set of addresses starting from the IP address of released global IP address field 90. Remote network devices 16 may use uses this field to inform other hosts (e.g., local network device 12 and other remote network devices 16) that a set of global IP addresses are available for use with a single neighbor advertisement message. Released global IP address field 90 and range for pool of released global IP addresses field 92 are optional and included according to a value of code field 74.

In general, remote network devices 16 may receive a neighbor solicitation message, e.g., in accordance with neighbor solicitation message format 50 of FIG. 2, from local network device 12 specifying a range of global IP addresses that local network device 12 is requesting to reserve. In accordance with the techniques of this disclosure, if one of remote network devices 16 does not have any of the IP addresses reserved, the one of remote network devices 16 may ignore the neighbor solicitation message.

However, if one of remote network devices 16 has one or more of the IP addresses reserved, the one of remote network devices 16 constructs a neighbor advertisement message, e.g., in accordance with neighbor advertisement message format 70 of FIG. 3. In particular, the one of remote network devices 16 has one or more of the IP addresses of a received neighbor solicitation message reserved, the one of remote network devices 16 may determine whether to release the IP addresses or indicate that the IP addresses are reserved to local network device 12 using a neighbor advertisement message.

In particular, if the one of remote network devices 16 determines that one or more of the IP addresses that were previously reserved are no longer needed, the one of remote network devices 16 constructs a neighbor advertisement message specifying a first released IP address in released global IP address field 90, and a range value representing a range of released IP addresses starting from the first released IP address in range for pool of released global IP addresses field 92.

Additionally or alternatively, if the one of remote network devices 16 determines that one or more of the IP addresses that were requested in the neighbor solicitation message are currently reserved and must remain reserved, the one of remote network devices 16 may specify a first reserved IP address in reserved global IP address field 86, and a range value representing a range of reserved IP addresses starting from the first reserved IP address in range for pool of reserved global IP addresses field 88.

Based on receiving a neighbor advertisement message specifying a group of global IP addresses within a range of global IP addresses that are to be released, local network device 12 may determine that at least a subset of the global IP addresses is available, excluding the group of global IP addresses specified by the responding network device that are reserved. Accordingly, in some examples, local network device 12 may reserve the subset of global IP addresses.

In some examples, the group of global IP addresses specified as reserved by one or more of remote network devices 12 in response to a neighbor solicitation message includes all global IP addresses within the range of global IP addresses of the neighbor solicitation message. In such examples, local network device 12 determines whether there are any duplicates in a range of global IP addresses starting from a different target global IP address, and may repeat these example operations until local network device 12 determines global IP addresses that are available.

In some examples, in response to receiving a neighbor solicitation message specifying a range of requested global IP addresses, one of remote network devices 16 may determine one or more global IP addresses reserved by the one of remote network devices 16 are within the range of requested global IP addresses. However, the one of remote network devices 16 may determine that some of the global IP addresses that the one of remote network devices 16 reserved can be released (e.g., because the one of remote network devices 16 determines that all global IP addresses are not needed).

In such examples, the one of remote network devices 16 may transmit a neighbor advertisement message identifying which ones of the global IP addresses the one of remote network devices 16 is releasing, and which ones of the global IP addresses the one of remote network devices 16 is having conflict/overlap and keeping in reserved. In response, local network device 12 may reserve the released global IP addresses. If local network device 12 determines that additional global IP addresses are needed, local network device 12 may transmit another neighbor solicitation message that specifies a range of global IP addresses starting from a different, target global IP address, and repeat these example operations until local network device 12 reserves sufficient global IP addresses.

Figure 4:
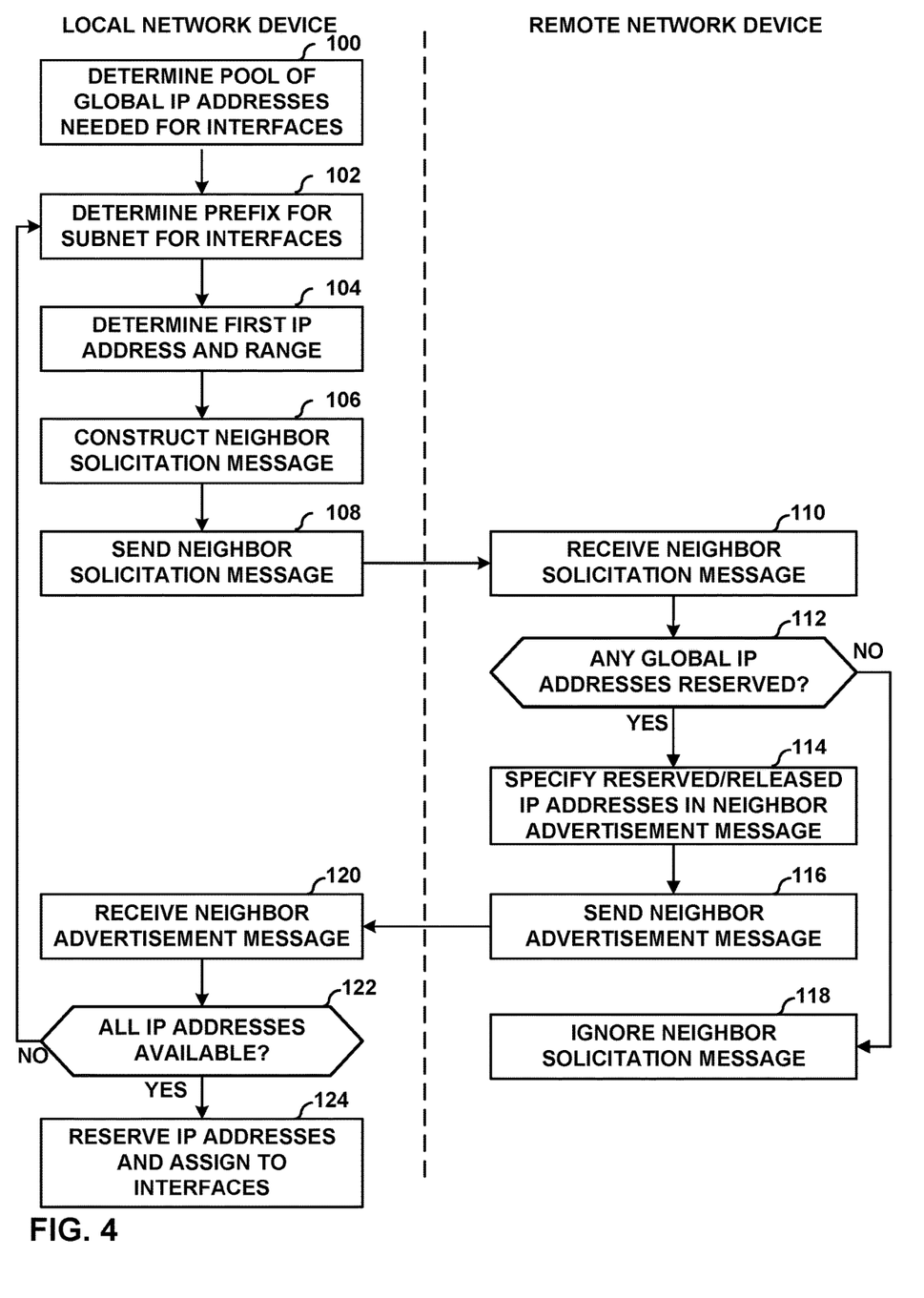
FIG. 4 is a flowchart illustrating an example method by which a network device may reserve a pool of global IP addresses for a plurality of virtual machines (VMs).

FIG. 4 is a flowchart illustrating an example method by which a network device (e.g., local network device 12) may reserve a pool of global IP addresses for a plurality of virtual machines (VMs), e.g., VMs 24. The method of FIG. 4 is explained with respect to local network device 12 and remote network device 16A of FIG. 1. However, other devices may perform these or similar techniques. For example, each of remote network devices 16 may perform the elements attributed to the remote network device of FIG. 4.

Initially, local network device 12 determines a pool of global IP addresses that are needed (100). In particular, local network device 12 determines a number of global IP addresses that are needed. For example, local network device 12 may determine a number of network interfaces needing global IP addresses, e.g., for VMs that are to be instantiated or that are likely to be instantiated in the near future or for network devices to be configured in the near future. This determination may be based on, for example, configuration data from an administrator. Additionally or alternatively, local network device 12 may determine a number of new network interfaces needing global IP addresses based on a rate of VM instantiation and/or VM usage.

Local network device 12 may also determine a prefix for a subnet for the network interfaces (102). In particular, local network device 12 may determine a subnet to which the network interfaces are to be connected, and send a router solicitation message to a router (e.g., router 36 of FIG. 1) to prompt router 36 to send a router advertisement message including a prefix for the subnet. Local network device 12 may then determine a first global IP address and a range of global IP addresses (104) to cover the network interfaces needing global IP addresses. For example, as discussed with respect to FIG. 1, local network device 12 may select the first IP address and the range of global IP addresses to include a number of global IP addresses that is equal to or greater than the number of needed IP addresses as determined above, and such that the range of global IP addresses includes IP addresses that are not reserved as indicated in database 30.

Local network device 12 then constructs a neighbor solicitation message (106). The neighbor solicitation message may conform to neighbor solicitation message format 50 of FIG. 2. In general, local network device 12 constructs the neighbor solicitation message to include data representing the first global IP address and the range of global IP addresses, e.g., values for target global IP address field 60 and range for pool of target global IP addresses field 62. Local network device 12 then sends the neighbor solicitation message (108) to remote network devices 16. In particular, local network device 12 may send the neighbor solicitation message to an IP address associated with a multicast group to which local network device 12 and remote network devices 16 are subscribed.

Remote network devices 16, such as remote network device 16A, may then receive the neighbor solicitation message (110). Remote network device 16A then determines whether any IP addresses in the range of global IP addresses are specified in the neighbor solicitation message are reserved (112). In the case that remote network device 16A does not have any of the specified IP addresses reserved ("NO" branch of 112), remote network device 16A may ignore the neighbor solicitation message (118) (e.g., by not sending a response to the neighbor solicitation message).

Assuming remote network device 16A has at least one IP address of the specified global IP addresses reserved ("YES" branch of 112), remote network device 16A may further determine whether any of the reserved IP addresses can be released (e.g., due to having been reserved but no longer in use). Remote network device 16A also releases those IP addresses that are determined can be released. Remote network device 16A may then construct a neighbor advertisement message (e.g., conforming to neighbor advertisement message format 70 of FIG. 3) specifying reserved IP addresses (e.g., using values for reserved global IP address field 86 and range for pool of reserved global IP addresses field 88) and/or released IP addresses (e.g., using values for released global IP address field 90 and range for pool of released global IP addresses field 92). Remote network device 16A then sends the neighbor advertisement message to local network device 12 (116), e.g., in accordance with neighbor advertisement format 70 of FIG. 3. For example, remote network device 16A may send the neighbor advertisement message to the broadcast or multicast group, such that the message reaches local network device 12 and each of the other remote network devices 16.

Local network device 12 may then receive the neighbor advertisement message (120). Local network device 12 then determines whether all requested IP addresses are available (122). If there are some requested IP addresses that are not available and not released ("NO" branch of 122), local network device 12 may reserve those IP addresses that are available and repeat the process from step 102 for those IP addresses that were not available, and iterate through this process until available IP addresses for all needed IP addresses have been determined ("YES" branch of 122). Local network device 12 may then reserve the IP addresses and assign the reserved IP addresses to VMs 24 (124), e.g., as the VMs are instantiated.

In this manner, the method of FIG. 4 represents an example of a method including determining, by a network device, to assign a number of global Internet protocol (IP) addresses to respective network interfaces of a plurality of network interfaces of a plurality of network devices, the number of global IP addresses being greater than two, determining, by the network device, a subnetwork to which the plurality of network interfaces are to be assigned, determining, by the network device, a prefix corresponding to the subnetwork, determining, by the network device, a first global IP address having the prefix, determining, by the network device, a range value that is equal to or greater than the number of global IP addresses, generating, by the network device, a message according to Duplicate Address Detection Protocol (DAD) including data indicating that the message includes a range of addresses, the data further indicating the first global IP address and the range value; and sending, by the network device, the message according to DAD to one or more host network devices to determine whether any global IP address in a range starting with the first global IP address and through the range value is in use by the one or more host network devices.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including processing circuitry implementing one or more processors as described above, in conjunction with suitable software and/or firmware.

Various embodiments of the techniques have been described. These and other embodiments are within the scope of the following claims.

What is claimed is:

1. A host network system comprising:
a network interface implemented in circuitry; and
one or more processors implemented in circuitry and configured to:
receive a first message according to Duplicate Address Detection Protocol (DAD) from a first local network device, the first message including data indicating that the first message includes a first range of global Internet protocol (IP) addresses, the data further indicating a first ordinal first global IP address in the first range and a first range value;
determine that at least one global IP address in the first range of global IP addresses starting with the first ordinal first global IP address and through the first range value is reserved by the host network system;
send, via the network interface, a response message representative of the at least one global IP address;
receive a second message according to DAD from a second local network device, the second message including data indicating that the second message includes a second range of global IP addresses, the data further indicating a second ordinal first global IP address in the second range and a second range value;
determine that no global IP addresses in the second range of global IP addresses are reserved by the host network system; and
in response to determining that no global IP addresses in the second range of global IP addresses are reserved by the host network system, ignore the second message.

2. The host network system of claim 1, wherein to send the response message, the one or more processors are configured to send a neighbor advertisement message specifying that the at least one global IP address is reserved.

3. The host network system of claim 2, wherein the one or more processors are configured to send the neighbor advertisement message to the first local network device.

4. The host network system of claim 1, wherein the one or more processors are further configured to determine whether to retain reservation of the at least one global IP address.

5. The host network system of claim 1, wherein the one or more processors are further configured to determine to release reservation of the at least one global IP address, wherein to send the response message, the one or more processors are configured to send one or more neighbor advertisement messages, including the response message, to one or more other host network devices indicating that the host network system is releasing reservation of the at least one global IP address.

\* \* \* \* \*